United States Patent Office 3,009,938
Patented Nov. 21, 1961

3,009,938
PROCESS FOR THE MANUFACTURE OF HALOGENATED STEROIDS
David H. Gould, Leonia, Hans Reimann, Bloomfield, and Lawrence E. Finckenor, Lynhurst, N.J., assignors to Schering Corporation, Bloomfield, N.J., a corporation of New Jersey
No Drawing. Filed June 1, 1959, Ser. No. 817,047
11 Claims. (Cl. 260—397.45)

This invention relates to a novel method for halogenating a $\Delta^{9(11)}$-dehydro steroid so as to produce a $9\alpha,11\beta$-dihalogeno product. More particularly, this invention relates to a method for preparing 9,11-dihalogeno compounds of the pregnane and androstane series. By the term "pregnane and androstane series" we include in addition to saturated compounds those compounds containing one or more unsaturations in the A ring such as 3-keto-$\Delta^4$,3-keto-$\Delta^1$, and 3-keto-$\Delta^{1,4}$-analogs.

By virtue of our process we are able to introduce halogen atoms at the 9- and 11-positions of a steroid by subjecting a $\Delta^{9(11)}$-dehydro steroid to the action of a particular class of halogenating agents. The halogen atoms at C-9 and C-11 may be the same, for example both may be chlorine or bromide, or they may be different. In the latter situation the process is such that the more electronegative atom attaches to C-11 while the more electropositive atom attaches to C-9. Thus when employing a reagent which supplies both chlorine and fluorine atoms, the product is a $9\alpha$-chloro-$11\beta$-fluoro substance.

Our halogenating agents, as described below are of the conventional type. We have found however, that a higher yield and greater purity is obtained when there is also present a halide ion common to the halogen attaching itself to C-11. The presence of common ion reduces competing reactions which for example sometimes occur with the solvent. We prefer to carry out our reactions in acetic acid, and in the absence of an ion common to the halogen appearing at C-11, mixtures are obtained consisting of products containing an $11\beta$-acetate group. Thus halogen donors which may be used in our process are: (1) isoatomic molecular halogens such as chlorine in the presence of chloride ion or bromine in the presence of bromide ion, (2) molecular halogen donors such as the addition compounds pyridinium bromide perbromide, dioxane dibromide, iodobenzene dichloride and p-iodotoluene dichloride, (3) a heteroatomic halogen molecule such as iodine monochloride, (4) a mixture of reagents comprising a positive halogen donor such as a molecular halogen or a compound such as N-chlorosuccinimide, N-bromoacetamide, dimethyl-N,N-dibromohydantoin, and N-iodosuccinimide, together with a halogen ion having an electronegativity equal to or greater than that of the above-mentioned positive halogen donor. Examples of such mixtures are lithium chloride and N-chlorosuccinimide, lithium chloride and chlorine, hydrogen fluoride and N-bromoacetamide, hydrogen bromide and N-bromoacetamide, potassium fluoride and N-iodosuccinimide, hydrogen chloride, lithium chloride and N-chlorosuccinimide, and the like.

In the halogenation reaction, the halogenating agent may be considered as giving rise to positive halogen, i.e., electron-deficient halogen ion which attacks the 9-position. The electron-rich halogen ion attacks the 11-position. Thus the presence of at least one equivalent of halide ion above that supplied by isoatomic or heteroatomic halogen molecules results in the beneficial effect described above.

Homo-halogenation, that is, halogenation whereby the same halogen is introduced at C-9 and C-11 may be effected in the same manner as hetero-halogenation (different halogen at C-9 and C-11) by employing reagents such as the N-haloamides in admixture with a source of halide ion. Halide ion may be supplied by a hydrohalic acid or a suitable salt such as sodium bromide, lithium chloride, potassium fluoride, or by mixtures of an acid and a corresponding salt. Whenever hydrohalic acid is the source of halogen-anion, approximately theoretical quantities are generally used, whereas when the halogen-anion source is a salt it may be present in large excess.

It is apparent from the above, that there are a number of different but equivalent methods by which the same compound may be prepared. For example, a $9\alpha,11\beta$-dichloro compound may be prepared by utilizing such reagents and combinations as (1) chlorine and lithium chloride in acetic acid, (2) N-chloro succinimide and lithium chloride in glacial acetic acid, (3) sodium chloride and N-chlorosuccinimide in glacial acetic acid together with hydrogen chloride in tetrahydrofuran, (4) chlorine and hydrogen chloride in glacial acetic acid. The choice of solvent in each reaction is naturally determined by the solubility of the reagents in the process.

Our process, whereby a 9,11-dehydrosteroid is converted to a $9\alpha,11\beta$-dihalogeno derivative is generally carried out in the presence of a suitable solvent at temperatures ranging from 5° C. to 50° C. for a period of from one-half hour to 24 hours, depending on the reagents involved. The preferred reaction conditions usually involve the use of glacial acetic acid as the sole or major solvent, with the reaction being carried out at room temperature for a period of approximately two hours.

Although glacial acetic acid is generally the preferred solvent, other solvents may be used in our dihalogenation process either alone or in combination with acetic acid. Solvents which may be employed include lower aliphatic acids such as acetic and diethylacetic, halogenated hydrocarbons such as methylene chloride and chloroform, saturated ethers such as tetrahydrofuran and dioxane, other inert solvents such as dimethylsulfoxide as well as suitable mixtures of these solvents.

In those instances wherein the halogenating agent is a mixture of an N-halogenoamide and a halide salt or hydrohalic acid it is somewhat surprising that the reaction proceeds as described above. N-haloamides have been known to halogenate positions allylic to double bonds, however in this method the presence of halide ion with the reagent appears to promote saturation of the 9,11-bond with halogen. Furthermore, our process is preferably applied to pregnanes and androstanes possessing a 3-keto-$\Delta^4$, 3-keto-$\Delta^1$ or 3-keto-$\Delta^{1,4}$-system. Even in the presence of these conjugated unsaturations, neither addition to the conjugated system nor allylic halogenation occurs. Thus our halogenation process selectively acts upon the $\Delta^{9,11}$-bond in the presence of other unsaturations.

By our process we are able to produce dihalogeno analogs of Reichstein's compound S, of the $\Delta^1$-dehydro analog of Reichstein's compound S as well as various nucleously substituted analogs thereof. These compounds, which may be represented by the following general formula, including the 1,2-dihydro analogs thereof

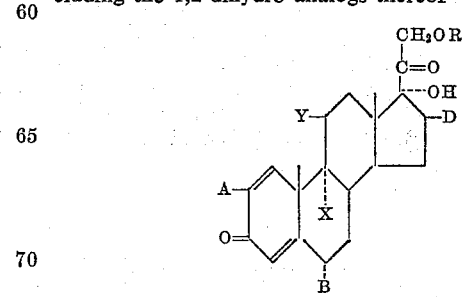

wherein A and B are H or methyl, D represents H, $\alpha$- lower alkyl, β-lower alkyl, α-hydroxy, α-lower alkanoyloxy, R represents H or a lower alkanoic acid radical, or an acid radical of an organic dibasic acid such as succinic or sulfobenzoic, or inorganic acid radicals such as phosphate or sulfate; X being halogen of atomic weight greater than 19 and Y being halogen of atomic weight less than 126.

These compounds as described in our copending application Serial No. 743,492 filed June 20, 1958, now Patent No. 2,894,963 of which this application is a continuation-in-part are valuable anti-inflammatory agents. It is indeed surprising that these compounds are anti-inflammatory since heretofore it has been believed that an oxygen function at C-11 was a prerequisite for anti-inflammatory activity.

In addition to the aforementioned corticoids, our process is applicable in the manufacture of 9,11-dihalogeno analogs of progesterone, 17α-acetoxyprogesterone and other related compounds. These dihalogeno compounds are also progestional in activity and find utility in the treatment of dysmenorrhea, threatened abortion and the like, and are described and claimed in the copending applications of Reimann et al., Serial Nos. 817,049; 817,050; 817,051; 817,052; 817,032; 817,053; 817,054; and 817,055, filed June 1, 1959, respectively.

Our halogenation process is not restricted to the manufacture of dihalogeno pregnanes but is equally applicable to preparing 9,11 dihalogeno androstanes such as 9α,11β-dihalogeno-1,4-androstadiene-3,17-dione, the 1,2-dihydro analog thereof and other similar compounds. These compounds are also therapeutically valuable as described and claimed in the co-pending applications of Gould et al., Serial Nos. 817,071 and 817,070 filed June 1, 1959, respectively. Thus our novel process is generally applicable to any steroid possessing a 9,11-double bond and optionally unsaturated elsewhere in the A-ring. Our preferred steroid reactants as indicated heretofore are 3-keto-$\Delta^4$ or 3-keto-$\Delta^{1,4}$-pregnanes and androstanes.

The following examples are illustrative of our novel process.

EXAMPLE 1

*9α-bromo-11β-chloro-1,4-pregnadiene-17α,21-diol-3,20-dione 21-acetate*

A solution of 1.0 g. of 1,4,9(11)-pregnatriene-17α,21-diol-3,20-dione 21-acetate and 5.0 g. of lithium chloride in 40 ml. of glacial acetic acid is treated with 0.395 g. of N-bromoacetamide, followed by 0.104 g. of anhydrous hydrogen chloride dissolved in 1 ml. of tetrahydrofuran. The reaction mixture is stirred at room temperature for 3 hours, and poured into ice-water. The mixture is filtered and the precipitate is washed with water yielding 1.23 g. of the crude substance of this example. Recrystallization from acetone-hexane affords pure 9α-bromo-11β-chloro-1,4-pregnadiene-17α,21-diol-3,20-dione 21-acetate; M.P. 190–195° C. (dec.); $[\alpha]_D^{20}+172°$ (dioxane);

$$\lambda_{max.}^{MeOH} \; 239 \; m\mu, \; \epsilon=14,500$$

*Analysis.*—Calcd. for $C_{23}H_{28}O_5ClBr$: C, 55.26; H, 5.65; Cl, 7.09; Br, 15.99. Found: C, 55.28; H, 5.34; Cl, 7.01; Br, 15.60.

EXAMPLE 2

*9α,11β-dichloro-1,4-pregnadiene-17α,21-diol-3,20-dione 21-acetate*

A solution of 1.0 g. of 1,4,9(11)-pregnatriene-17α,21-diol-3,20-dione 21-acetate and 5.0 g. lithium chloride in 40 ml. of glacial acetic acid is treated with 0.410 g. of N-chlorsuccinimide, followed by 0.104 g. of anhydrous hydrogen chloride dissolved in 2.5 ml. of tetrahydrofuran. The reaction mixture is stirred for 2 hours and poured into ice-water. The crude product is filtered and washed with water to give 1.12 g. of solid material, which is recrystallized from acetone-hexane to give substantially pure 9α,11β-dichloro-1,4-pregnadiene-17α,21-diol-3,20-dione 21-acetate; M.P. 246–253° C. (dec.); $[\alpha]_D^{25}+162°$ (dioxane);

$$\lambda_{max.}^{MeOH} \; 237 \; m\mu, \; \epsilon=15,000$$

*Analysis.*—Calcd. for $C_{23}H_{28}O_5Cl_2$: C, 60.66; H. 6.20; Cl, 15.57. Found: C, 60.24; H, 6.14; Cl, 15.99.

The compound of this example is alternatively prepared by treating a solution of 1.0 g. of 1,4,9(11)-pregnatriene-17α,21-diol-3,20-dione 21-acetate and 5.0 g. of lithium chloride in 40 ml. of glacial acetic acid with a solution of 203 mg. of anhydrous chlorine in 5 ml. of tetrahydrofuran, followed by stirring at room temperature for 3 hours; work-up and physical constants as above.

EXAMPLE 3

*9α-iodo-11β-fluoro-1,4-pregnadiene-17α-21-diol-3,20-dione 21-acetate*

To a solution of 500 mg. of 1,4,9(11)-pregnatriene-17α,21-diol-3,20-dione 21-acetate and 3.0 g. of potassium fluoride in 40 ml. of dimethylsulfoxide there is added 300 mg. of N-iodosuccinimide. The reaction mixture is stirred at room temperature for 16 hours, poured into ice-water, and extracted with methylene chloride. The organic extracts are then treated with decolorizing carbon, and concentrated in vacuo. The resultant residue is chromatographed on silica gel, the fraction eluted with 50% ether-hexane yielding 9α-iodo-11β-fluoro-1,4-pregnadiene-17α,21-diol-3,20-dione 21-acetate;

$$\lambda_{max.}^{MeOH} \; 240 \; m\mu$$

EXAMPLE 4

*9α,11β-dichloro-1,4-pregnadiene-17α,21-diol-3,20-dione*

One gram of 1,4,9(11)-pregnatriene-17α,21-diol-3,20-dione is treated with chlorine gas and lithium chloride, in glacial acetic acid solution, as described in Example 2. The resulting product is crystallized from acetone to give 9α,11β-dichloro-1,4-pregnadiene-17α,21-diol-3,20-dione; M.P. 238–241° C. (dec.); $[\alpha]_D^{20}+134°$ (pyridine);

$$\lambda_{max.}^{MeOH} \; 237 \; m\mu, \; \epsilon=15,400$$

*Analysis.*—Calcd. for $C_{21}H_{26}O_4Cl_2$; C, 61.02; H, 6.34; Cl, 17.15. Found: C, 61.26; H, 6.30; Cl. 16.66.

Alternatively the compound of this example is prepared by saponification of the produce of Example 2.

EXAMPLE 5

*9α,11β-dibromo-1,4-pregnadiene-17α,21-diol-3,20-dione 21-acetate*

A solution of 1.0 g. of 1, 4, 9(11)-pregnatriene-17α, 21-diol-3,20-dione 21-acetate and 5.0 g. of lithium bromide in 40 ml. of glacial acetic acid is treated with 0.395 g. of N-bromoacetamide followed by 236 mg. of hydrogen bromide dissolved in 2.5 ml. of tetrahydrofuran. The reaction mixture is stirred at room temperature for 2 hours and poured into ice-water. The mixture is filtered and the solid material is washed with water and recrystallized from acetone-hexane, yielding 9α,11β-dibromo-1,4-pregnadiene-17α,21-diol-3,20-dione 21-acetate; M.P. 142–146° C. (dec.); $[\alpha]_D^{20}+185°$ (dioxane);

$$\lambda_{max.}^{MeOH} \; 240 \; m\mu, \; \epsilon=14,200$$

*Analysis.*—Calcd. for $C_{23}H_{28}O_5Br_2$: C, 50.75; H, 5.18; Br, 29.37. Found: C, 51.00; H, 5.04; Br, 28.82.

EXAMPLE 6

*9α,11β-dichloro-1,4-androstadiene-3,17-dione*

To a stirred solution of 1.32 g. of 1,4,9(11)-androstatriene-3,17-dione and 5.0 g. of lithium chloride in 60 ml. of diethylacetic acid at room temperature, is added 686 mg. of N-chlorosuccinimide followed at once by 5 ml. of one normal aqueous hydrochloric acid. Stirring is continued at room temperature for 17 hours, and the reaction mixture is then poured into saturated aqueous sodium bicarbonate solution. The resulting mixture is extracted with methylene chloride and the extracts are washed with water, dried with magnesium sulphate and evaporated in vacuo to yield the crude product. Crystallization from acetone-hexane gives 9α,11β-dichloro-1,4-androstadiene-3,17-dione, M.P. 227–231° dec., $[\alpha]_D$ +178° (dioxane), $$\lambda_{max.}^{MeOH}\ 235\ m\mu\ (15,600)$$

*Analysis.*—Calcd. for $C_{19}H_{22}O_2Cl_2$: C, 64.59; H, 6.28; Cl, 20.07. Found: C, 64.24; H, 6.58; Cl, 19.67.

EXAMPLE 7

*9α-bromo-11β-fluoro-1,4-androstadiene-3,17-dione*

To a stirred solution of 1.0 g. of 1,4,9(11)-androstatriene-3,17-dione in 50 ml. of diethylacetic acid contained in a polyethylene bottle at room temperature is added a solution of 1.35 g. of hydrogen fluoride in 5 ml. of 1:2 chloroform-tetrahydrofuran solution followed by 535 mg. of N-bromoacetamide. Stirring is continued at room temperature for 17 hours, and the solution is then poured into 500 ml. of 10% aqueous sodium bicarbonate solution. The mixture is extracted with methylene chloride, and the extracts are washed with water, dried with magnesium sulphate and evaporated in vacuo to give 1.21 g. of the crude product. Crystallization from acetone-hexane affords 9α-bromo-11β-fluoro-1,4-androstadiene-3,17-dione, M.P. 194–196° dec., $[\alpha]_D$+118° (dioxane), $$\lambda_{max.}^{MeOH}\ 239\ m\mu\ (14,000)$$

*Analysis.*—Calcd. for $C_{19}H_{22}O_2BrF$: C, 59.84; H, 5.82; Br, 20.96; F, 4.98. Found: C, 60.00; H, 5.94; Br, 20.92; F, 4.32.

EXAMPLE 8

*1,4,9(11)-androstatriene-17β-ol-3-one-17β-propionate*

A. 1,4,9(11)-ANDROSTATRIENE-17β-OL-3-ONE

To a solution of 200 g. of sucrose in 1.5 liters of tap water, contained in a 2-liter Fernbach flask, is added 500 mg. of 1,4,9(11)-androstatriene-3,17-dione. The resulting suspension is autoclaved at 15 lbs. pressure and at 120° for 45 minutes. To the cooled solution is then added 100 ml. of ethanol and 100 g. of bakers yeast. The pH of the reaction mixture is adjusted to 4.5–5.0 by the addition of dilute sulphuric acid, the yeast cell mass is dispersed, and mechanical agitation, sufficiently slow to maintain anaerobic conditions, is commenced.

This agitation is continued for 48 hours, and during the first 12 hours the pH of the medium is adjusted hourly to 4.5–5.0 by addition of dilute ammonium hydroxide. Subsequently pH determinations and adjustments are made every 8 hours. At the end of the reaction period the mixture is centrifuged for one hour, and the supernatant liquid is separated and the remaining cell mass is extracted by refluxing for ½ hour with two 1-liter portions of methanol. The combined methanolic extracts and supernatant liquid are concentrated in vacuo to about 200 ml. and 400 ml. of water is added. The resultant aqueous solution is then extracted three times with methylene chloride, and the combined methylene chloride extracts are dried with magnesium sulphate and evaporated in vacuo. The resulting crude residue is extracted three times with boiling diethyl ether, and the combined ethereal extracts are passed through a column of Florisil. The eluates are evaporated and the residue is crystallized from acetone-hexane to give 1,4,9(11)-androstatriene-17β-ol-3-one, M.P. 145–148°, $[\alpha]_D$—28° (dioxane), $$\lambda_{max.}^{MeOH}\ 238\ m\mu\ (15,300)$$

*Analysis.*—Calcd. for $C_{19}H_{24}O_2$: C, 80.24; H, 8.51. Found: C, 79.91; H, 8.90.

B. 1,4,9(11)-ANDROSTATRIENE-17β-OL-3-ONE-17β-PROPIONATE

To a solution of one gram of 1,4,9(11)-androstatriene-17β-ol-3-one (prepared according to the procedure of Example 8A) in 20 ml. of pyridine at room temperature is added 5 ml. of propionic anhydride and the reaction mixture is allowed to stand for 17 hours at room temperature. The reaction mixture is then poured into crushed ice and the resulting mixture is allowed to attain room temperature, then filtered. The residue is washed with water, dried and crystallized from acetone-hexane to give 1,4,9(11)-androstatriene-17β-ol-3-one-17β-propionate, M.P. 137–138°, $[\alpha]$—12° (dioxane), $$\lambda_{max.}^{MeOH}\ 238\ m\mu\ (15,400)$$

*Analysis.*—Calcd. for $C_{22}H_{28}O_3$: C, 77.61; H, 8.29. Found: C, 77.94; H, 8.46.

Similarly by allowing 1,4,9(11)-androstatriene-17β-ol-3-one to react with the appropriate hydrocarbon acid anhydrides other 17-acylates of 1,4,9(11)-androstatriene-17β-ol-3-one are produced.

EXAMPLE 9

*9α,11β-dichloro-1,4-androstadiene-17β-ol-3-one-17β-propionate*

To a stirred solution of one gram of 1,4,9(11)-androstatriene-17β-ol-3-one-17β-propionate (prepared according to the procedure of Example 8) and 4.0 g. of lithium chloride in 30 ml. of glacial acetic acid at room temperature is added 429 mg. of N-chlorosuccinimide followed immediately by 3.1 ml. of N-aqueous hydrochloric acid. Stirring is continued at room temperature for 3½ hours, and the reaction mixture is then poured into 300 ml. of cold water and extracted three times with methylene chloride. The combined extracts are washed with 5% aqueous sodium bicarbonate solution, then with water, and then dried with magnesium sulfate. Evaporation in vacuo yields a residue which is chromatographed on magnesium silicate. Elution with ether-hexane (3:1) affords 9α,11β-dichloro-1,4-androstadiene-17β-ol-3-one-17β-propionate which crystallizes from ether-pentane with M.P. 170–173°, $[\alpha]_D$+105° (dioxane), $$\lambda_{max.}^{MeOH}\ 237\ m\mu\ (15,200)$$

*Analysis.*—Calcd. for $C_{22}H_{28}O_3Cl_2$: C, 64.23; H, 6.86; Cl, 17.24. Found: C, 63.56; H, 6.95; Cl, 17.17.

Similarly other 17-acylates of 9α,11β-dichloro-1,4-androstadiene-17β-ol-3-one may be prepared by the above procedures.

EXAMPLE 10

*9α-bromo-11β-chloro-1,4-androstadiene-17β-ol-3-one-17β-propionate*

To a stirred solution of 800 mg. of 1,4,9(11)-androstatriene-17β-ol-3-one-17β-propionate and 4.0 g. of lithium chloride in 30 ml. of acetic acid at room temperature is added 356 mg. of N-bromoacetamide followed by 2.5 ml. of N-aqueous hydrochloric acid. Stirring is continued at room temperature for 3 hours and the reaction mixture is then poured into 300 ml. of cold water. The resulting mixture is then extracted with methylene chloride, and the organic extract is washed with 5% sodium bicarbonate solution, then water, and dried with magnesium sulphate. Evaporation in vacuo gives a crude residue which is chromatographed on magnesium silicate. Elution with ether-hexane (3:2) yields 9α - bromo - 11β - chloro - 1,4 - androstadiene - 17β-ol-3-one-17β-propionate, which is crystallized from ether-pentane, M.P. 128–130° dec., $[\alpha]_D$+112° (dioxane), $$\lambda_{max.}^{MeOH}\ 239\ m\mu\ (13,600)$$

*Analysis.*—Calcd. for $C_{22}H_{28}O_3BrCl$: C, 57.97; H, 6.19; Br, 17.53; Cl, 7.78. Found: C, 58.01; H, 6.36; Br, 17.50; Cl, 7.95.

Other 17-acylates of 9α-bromo-11β-chloro-1,4-androstadiene-17β-ol-3-one, may be prepared by the above procedures.

EXAMPLE 11

9α-bromo-11β-fluoro-1,4-androstadiene-17β-ol-3-one-17β-propionate

To a stirred solution of 1.0 g. of 1,4,9(11)-androstatrione-17β-ol-3-one-17β-propionate in 50 ml. of diethylacetic acid contained in a polyethylene bottle at room temperature, is added a solution of 1.35 g. of hydrogen fluoride in 5 ml. of 1:2 chloroform-tetrahydrofuran followed by 356 g. of N-bromoacetamide. Stirring is continued at room temperature for 17 hours, and the reaction mixture is then poured into 500 ml. of 10% aqueous sodium carbonate solution. The mixture is extracted with methylene chloride, and the extracts are washed with water, dried with magnesium sulphate, and evaporated in vacuo to give the crude product. Subsequent crystallization from acetone-hexane gives 9α-bromo - 11β - fluoro - 1,4 - androstadiene - 17β - ol-3-one-17β-propionate, M.P. 160–162°, $[\alpha]_D + 64°$ (dioxane), $$\lambda_{max.}^{MeOH} \ 239 \ m\mu \ (14,400)$$

*Analysis.*—Calcd. for $C_{22}H_{28}O_3BrF$: C, 60.14; H, 6.42; Br, 18.19; F, 4.32. Found: C, 60.22; H, 6.55; Br, 19.10; F, 4.13.

EXAMPLE 12

17α-hydroxy-4,9(11)-pregnadiene-3,20-dione 17-acetate

To a solution of 5.0 g. of 17α-hydroxy-4,9(11)-pregnadiene-3,20-dione in 50 ml. of acetic acid there is added 10 ml. of trifluoroacetic anhydride. The solution is heated on the steam bath for 45 minutes, then is poured into ice-water. A solid separates which is filtered and crystallized from acetone-ether to give 17α-hydroxy-4,9(11)-pregnadiene-3,20-dione 17-acetate, M.P. 238–241° C., $[\alpha]_D + 50°$ (chloroform), $$\lambda_{max.}^{MeOH} \ 239 \ m\mu, \ \epsilon = 17,000$$

*Analysis.*—Calcd. for $C_{23}H_{30}O_4$: C, 74.56; H, 8.16. Found: C, 74.64; H, 8.07.

EXAMPLE 13

9α,11β-dichloro-17α-hydroxyprogesterone 17-acetate

A solution of 1 g. of 17α-hydroxy-4,9(11)-pregnadiene-3,20-dione 17-acetate (the compound of Example 12) and 4 g. of lithium chloride in 40 ml. of glacial acetic acid is cooled to about 10° and there is added 250 mg. of hydrogen chloride in 1 ml. of tetrahydrofuran followed by 395 mg. of 96% N-chlorosuccinimide. The solution is stirred at room temperature for 20 minutes in the absence of light, then is poured into ice-water with stirring. A precipitate forms which is filtered, washed with water, triturated with ether and crystallized twice from acetone-hexane to give 9α,11β-dichloro-17α-hydroxyprogesterone 17-acetate, M.P. 224–233° C. dec., $[\alpha]_D + 129°$ (chloroform), $$\lambda_{max.}^{MeOH} \ 238 \ m\mu, \ \epsilon = 17,000$$

*Analysis.*—Calcd. for $C_{23}H_{30}O_4Cl_2$: C, 62.58; H, 6.85; Cl, 16.06. Found: C, 62.63; H, 7.03; Cl, 15.90.

Alternatively, the compound of this example is prepared by adding a solution of 200 mg. of chlorine in 30 ml. of acetic acid to a mixture of 1 g. of 17α-hydroxy-4,9(11)-pregnadiene-3,20-dione 17-acetate and 4 g. of lithium chloride in 20 ml. of glacial acetic acid. The mixture is stirred at room temperature for 3 hours, then poured into ice-water with stirring. A solid product precipitates which is filtered, washed with water, triturated with ether, and crystallized from acetone-hexane to give 9α,11β-dichloro-17α-hydroxyprogesterone 17-acetate.

EXAMPLE 14

9α-bromo-11β-chloro-17α-hydroxyprogesterone 17-acetate

One gram of 17α-hydroxy-4,9(11)-pregnadiene-3,20-dione 17-acetate (the compound of Example 12) and 4 g. of lithium chloride is dissolved in 50 ml. of glacial acetic acid and there is added 420 mg. of N-bromoacetamide. The mixture is stirred at room temperature and a slow stream of gaseous hydrogen chloride is passed over the surface until the solution begins to darken (10–30 seconds). The hydrogen chloride gas is removed and the solution is stirred in the dark at room temperature for about 10 minutes. The solution is poured into ice-water with stirring and the resultant solid is filtered, washed with water, and crystallized from acetone-hexane to give 9α - bromo-11β-chloro-17α-hydroxyprogesterone 17-acetate, M.P. 124–129° C. dec., $[\alpha]_D + 142°$ (chloroform)

$$\lambda_{max.}^{MeOH} \ 242 \ m\mu, \ \epsilon = 15,600$$

*Analysis.*—Calcd. for $C_{23}H_{30}O_4BrCl$: C, 56.85; H, 6.22; Br, 16.45; Cl, 7.30. Found: C, 56.83; H, 6.28; Br, 16.07; Cl, 7.35.

EXAMPLE 15

17α-hydroxy-1,4,9(11)-pregnatriene-3,20-dione

A. 17α,21-DIHYDROXY-1,4,9(11)-PREGNATRIENE-3,20-DIONE

A solution of 2 g. of 17α,21-dihydroxy-1,4,9(11)-pregnatriene-3,20-dione 21-acetate in 100 ml. of a 3:1 methanol chloroform mixture is chilled in ice to which there is added dropwise 52 ml. of 0.1 N sodium hydroxide solution (one equivalent). The reaction mixture is stirred at 0° C. for 10 minutes, then diluted with water and extracted with methylene chloride. Evaporation of the solvent and crystallization of the residue from acetone-hexane affords 17α,21-dihydroxy-1,4,9(11)-pregnatriene-3,20-dione, M.P. 220–228° C. (dec.);

$$\lambda_{max.}^{MeOH} \ 238 \ m\mu, \ \epsilon = 15,500$$

*Analysis.*—Calcd. for $C_{21}H_{26}O_4$: C, 73.66; H, 7.66. Found: C, 73.58; H, 7.54.

B. 17α-HYDROXY-1,4,9(11)-PREGNATRIENE-3,20-DIONE

A solution of 10 g. of 17α,21-dihydroxy-1,4,9(11)-pregnatriene-3.20-dione (the compound of Example 15A) in 100 ml. of dry pyridine is chilled in a Dry Ice-acetone bath and there is added a solution of 6 g. of p-toluenesulfonyl chloride in 50 ml. of methylene chloride. The mixture is stirred in the cold bath for 2 hours and then kept at −20° C. for 24 hours. At the end of this time, the reaction mixture is diluted with methylene chloride and the solution washed first with water, then with 10% sulfuric acid, 10% sodium bicarbonate, very dilute hydrochloric acid and finally with water. The solution is dried over magnesium sulfate, filtered and concentrated to a residue which is dissolved in acetone. The acetone solution is warmed on the steam bath, decolorizing carbon added, and the solution filtered. To the clarified solution there is added a warm solution of 10 g. of sodium iodide in acetone. After heating this mixture on the steam bath for five minutes, three ml. of acetic acid is added, and the mixture is warmed before adding aqueous sodium bisulfite. The resulting pale yellow solution is poured into water and the resulting precipitate is filtered and washed with water, and crystallized from acetone-ether to give 17α-hydroxy-1,4,9(11)-pregnatriene-3,20-dione, M.P. 233–235° C., $$\lambda_{max.}^{MeOH} \ 238 \ m\mu$$

$\epsilon = 15,600$, $[\alpha]_D - 19°$ (chloroform).

EXAMPLE 16

17α-hydroxy-1,4,9(11)-pregnatriene-3,20-dione 17-acetate

A solution of 5 g. of 17α-hydroxy-1,4,9(11)-pregnatriene-3,20-dione (the compound of Example 15) is dissolved in 50 ml. of glacial acetic acid and 10 ml. of trifluoroacetic anhydride. The solution is left at room temperature for 24 hours, then poured into ice-water. A solid separates which is filtered, washed with water, and crystallized from acetone-hexane to give 17α-hydroxy-1,4,9(11)-pregnatriene-3,20-dione 17-acetate, $$\lambda_{max.}^{MeOH} \ 238 \ m\mu$$

EXAMPLE 17

9α,11β - dichloro - 17α - hydroxy - 1,4 - pregnadiene - 3, 20-dione 17-acetate One gram of 17α-hydroxy-1,4,9(11)-pregnatriene-3,20-dione 17-acetate (the compound of Example 16) is reacted with 395 mg. of N-chlorosuccinimide in the presence of hydrogen chloride and lithium chloride in the manner of Example 13 to give 9α,11β-dichloro-17α-hydroxy-1,4-pregnadiene-3,20-dione 17-acetate, $\lambda_{max.}^{MeOH}$ 238 m$\mu$ $\epsilon$=15,000 M.P. 230–235° C. dec. $[\alpha]_D$+129° (chloroform).

Alternatively, the compound of this example is prepared by the microbiological oxidation of 9α,11β-dichloro-17α-hydroxyprogesterone 17-acetate (the compound of Example 13) in the following manner.

A one hundred ml. broth culture containing a 0.1% yeast extract concentration, 9.0 ml. of 0.2 M $KH_2PO_4$ and 9.0 ml. of 0.2 M $Na_2HPO_4$, contained in a 300 ml. Erlenmeyer flask, is seeded with 1 ml. of a 24-hour broth culture of *Corynebacterium simplex* (A.T.C.C. 6946). The flask is incubated at 28° C. for 24 hours. A second 300 ml. Erlenmeyer flask containing 150 mg. of sterile 17α-hydroxy-1,4,9(11)-pregnatriene-3,20-dione 17-acetate in 5.0 ml. acetone is inoculated with the 24-hour culture of *Corynebacterium simplex* (A.T.C.C. 6946). The culture-containing steroid solution is incubated for 48 hours at 28–30° C.

After termination of the transformation period, the pH is 7.2–7.3. The culture is now directly extracted with 3 equal volumes of $CHCl_3$, the solvent volumes combined and concentrated on a steam bath to a residue which is crystallized from acetone-hexane to give 9α,11β-dichloro-17α-hydroxy-1,4-pregnadiene-3,20-dione 17-acetate, physical constants as above.

EXAMPLE 18

9α,11β-dichloroprogesterone

One gram of 4,9(11)-pregnadiene-3,20-dione and 4 g. of lithium chloride in 50 ml. of acetic acid are reacted with 250 ml. of hydrogen chloride and 500 mg. of 93% N-chlorosuccinimide in the manner of Example 13. The resultant product is isolated in the described manner and crystallized from acetone-hexane to give 9α,11β-dichloroprogesterone, M.P., 174–177° C., dec.

$\lambda_{max.}^{MeOH}$ 238 m$\mu$ $\epsilon$=(16,000), $[\alpha]_D$+243° (chloroform).

*Analysis.*—Calcd. for $C_{21}H_{28}O_2Cl_2$, C, 65.79; H, 7.36; Cl, 18.50. Found: C, 65.46; H, 7.59; Cl, 18.66.

We claim:

1. A process for halogenating the 9,11-double bond of steroids of the pregnane and androstane series, said series being saturated in the B ring, to produce 9α,11β-dihalogenated steroids of said pregnane and androstane series wherein the C–11 halogen is at least as electronegative as the C–9 halogen, which comprises treating a 9(11)-dehydro steroid of the group consisting of the pregnane and androstane series, said series being saturated in the B ring, in a liquid medium substantially anhydrous and substantially inert to halogenation, with a halogenating agent providing electron-deficient halogen ions and electron-rich ions, said electron-deficient halogen ions being substantially equimolar with said 9(11)-dehydro steroid, the combined atomic weights of said halogen ions being greater than 38 and less than 253.

2. The process according to claim 1 wherein the halogenation is effected in a lower alkanoic acid solvent.

3. A process according to claim 1 which comprises reacting a 9(11)-dehydropregnane of the group consisting of 3,20-diketo-4,9(11)-pregnadienes and 3,20-diketo-1,4,-9(11)-pregnatrienes, said pregnadienes and pregnatrienes being saturated in the B ring, with N-chlorosuccinimide, lithium chloride and hydrogen chloride.

4. The process according to claim 1 which comprises reacting a $\Delta^{9(11)}$-dehydropregnane of the group consisting of 3,20-diketo-4,9(11)-pregnadienes and 3,20-diketo-1,4,-9(11)-pregnatrienes, said pregnadienes and pregnatrienes being saturated in the B ring, with a halogenating agent comprising an N-haloamide in admixture with a halide, the halide being at least as electronegative as the halogen in the haloamide, with the combined atomic weight of said halide and said halogen in the haloamide being greater than 38 and less than 253 in a liquid medium substantially inert to halogenation.

5. Process according to claim 4 wherein the halogenating agent comprises N-chloroacetamide, lithium chloride and hydrogen chloride.

6. The process which comprises reacting a 9(11)-dehydro steroid of the group consisting of 3,20-diketo-4,9-(11)-pregnadienes and 3,20-diketo-1,4,9(11)-pregnatrienes, such pregnadienes and pregnatrienes being saturated in the B ring, with a halogenating agent comprising a molecular halogen of the group consisting of isoatomic and heteroatomic halogen molecules, said molecular halogen being substantially equimolar to said 9(11)-dehydro steroid in admixture with a halide ion, said molecular halogen having a molecular weight greater than 38 and less than 253, and the halogen in said halide ion being common to the more electronegative of the halogens provided by said molecular halogen.

7. Process according to claim 6 wherein the halogenating agent comprises chlorine and hydrogen chloride.

8. Process according to claim 6 wherein the halogenating agent is chlorine and lithium chloride.

9. The process which comprises reacting a $\Delta^{9(11)}$-dehydropregnane of the group consisting of 3,20-diketo-4,9-(11)-pregnadienes and 3,20-diketo-1,4,9(11)-pregnatrienes, said pregnadienes and pregnatrienes being saturated in the B ring, with a halogenating agent comprising addition compounds providing molecular halogen, said addition compound being substantially equimolar with said 9(11)-dehydropregnane in a liquid medium substantially inert to halogenation.

10. The process of producing 9α,11β-dichloro-1,4-pregnadiene-17α,21-diol-3,20-dione 21-acetate which comprises reacting in a liquid medium substantially anhydrous and substantially inert to halogenation 1,4,9(11)-pregnatriene-17α,21-diol-3,20-dione 21-acetate with chlorine and lithium chloride and isolating the 9α,11β-dichloro product therefrom.

11. The process of producing 9α,11β-dichloro-1,4-pregnadiene-17α,21-diol-3,20-dione 21-acetate which comprises reacting in a liquid medium substantially anhydrous and substantially inert to halogenation 1,4,9(11)-pregnatriene-17α,21-diol-3,20-dione 21-acetate with N-chlorosuccinimide, lithium chloride, and hydrogen chloride and isolating the 9α,11β-dichloro product therefrom.

References Cited in the file of this patent

UNITED STATES PATENTS

| | | |
|---|---|---|
| 2,707,190 | Farrar | Apr. 26, 1955 |
| 2,837,515 | Chemerda et al. | June 3, 1958 |

OTHER REFERENCES

Ziegler et al.: J. Am. Chem. Soc., vol. 74 (October 5, 1952), pages 4891–4894 (page 4893 necessary).